Nov. 23, 1965    A. K. SIMONS    3,219,386
SEAT ASSEMBLY
Filed July 30, 1962    2 Sheets-Sheet 1
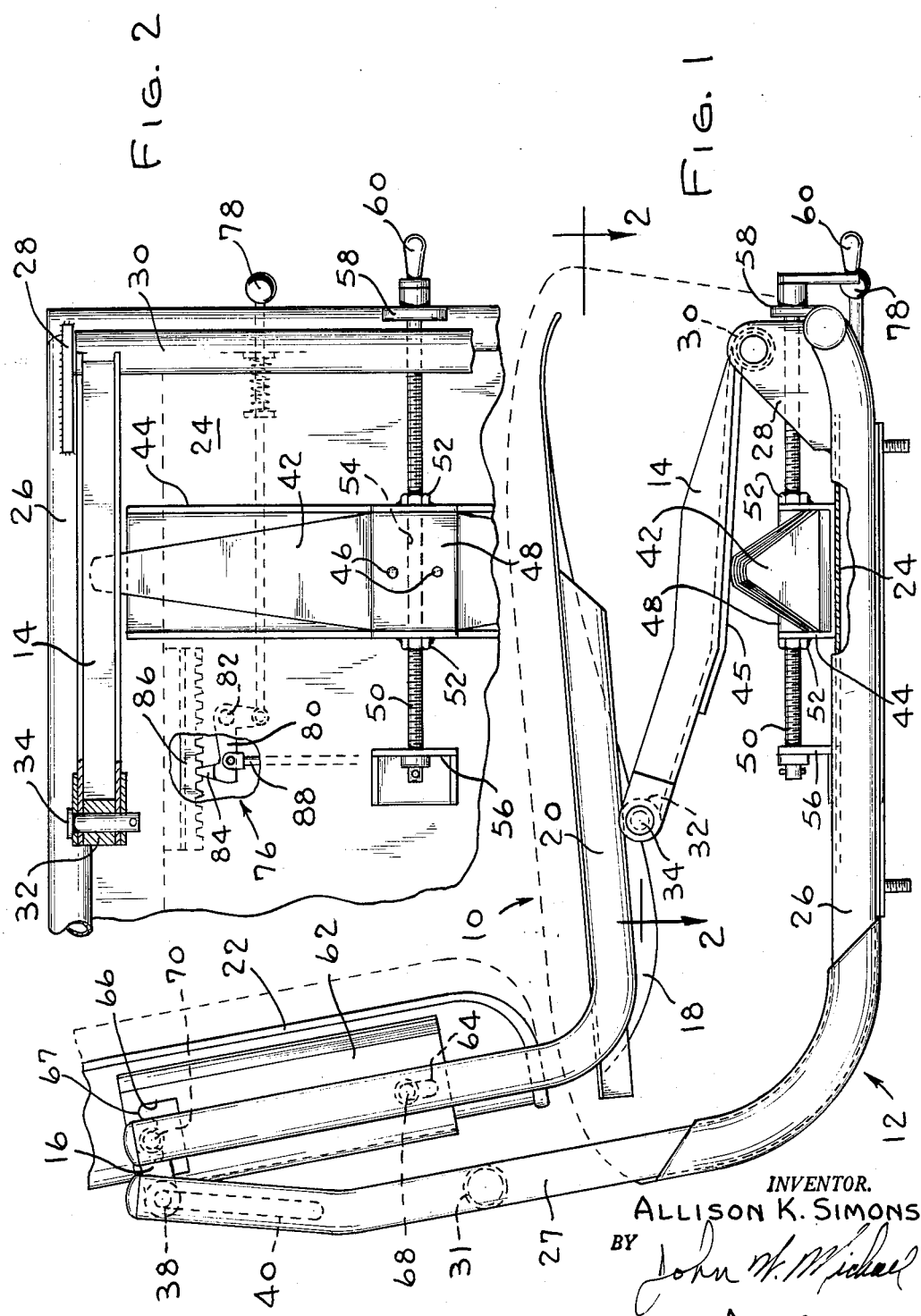
INVENTOR.
ALLISON K. SIMONS
BY
ATTORNEY Nov. 23, 1965  A. K. SIMONS  3,219,386
SEAT ASSEMBLY
Filed July 30, 1962  2 Sheets-Sheet 2
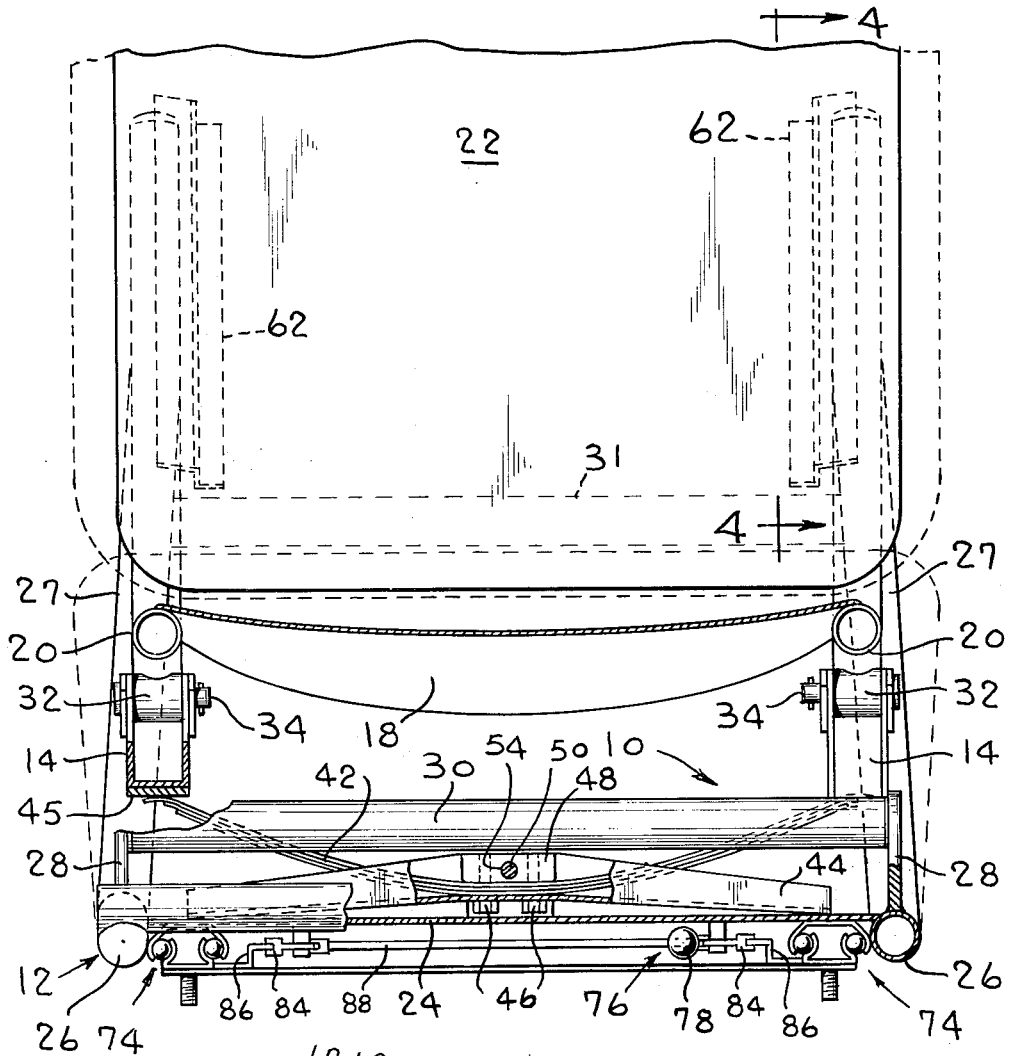
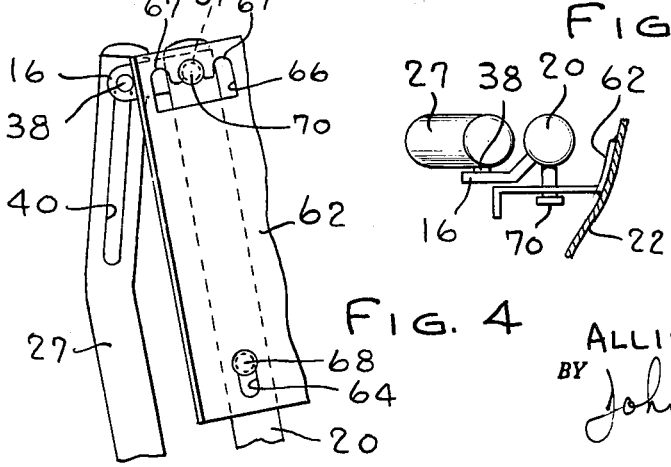
FIG. 3
FIG. 4
FIG. 5
INVENTOR.
ALLISON K. SIMONS
BY John W. Michael
ATTORNEY United States Patent Office 3,219,386
Patented Nov. 23, 1965

3,219,386
SEAT ASSEMBLY
Allison K. Simons, Zug, Switzerland, assignor to Bostrom Corporation, Milwaukee, Wis., a corporation of Wisconsin
Filed July 30, 1962, Ser. No. 213,292
12 Claims. (Cl. 297—309)

This invention relates to an improved seat assembly and suspension system.

The design of a seat and back cushion primarily for compact type vehicles presents special problems. Space requirements dictate the maximum limitations on the size of the seat suspension system. Efforts to reduce the space requirement have been generally directed to incorporating the suspension system beneath the seat in such a position that it can be collapsed into the seat such as shown in copending application Ser. No. 104,350, filed April 20, 1961 and now U.S. Patent 3,098,676. Seats of this type have proven successful but have required additional springs between the seat and base to maintain the seat in the same planar relationship to the base.

The primary object of this invention is to provide an improved seat suspension that overcomes the above problems.

Another object of this invention is to provide a simple and compact seat suspension that will maintain substantially the same planar relationship between the seat and base.

A further object of this invention is to provide an improved unitary seat and back cushion arrangement.

These objects are accomplished by mounting a seat pan and back support in a frame on a pair of lever arms that are pivotally connected to the frame and a pair of links that interconnect the back support and the frame. The seat pan is contoured so that anyone sitting in the seat will be forced to sit with his center of gravity located on the axis of the pivot points between the lever arms. The back support extends vertically upward from the seat and is connected to a vertical section of the frame by the links which are slidably received in a guide in the vertical section of the frame. The seat is therefore restricted in its vertical motion to the limits of motion of the link within the guide. A back cushion is adjustably mounted on the back support and moves with the seat.

Other objects and advantages will be pointed out in or be apparent from the specification and claims, as will obvious modifications of the embodiments shown in the drawings, in which:

FIG. 1 is a side view partly broken away of the seat and suspension system;

FIG. 2 is a view taken on line 2—2 of FIG. 1 showing the adjusting mechanism;

FIG. 3 is a front view of the seat partly broken away to show the adjusting mechanism;

FIG. 4 is a view taken on line 4—4 of FIG. 3 showing the adjusting mechanism; and FIG. 5 is a top view of the connecting link for the seat.

Referring more particularly to the drawings, seat assembly 10 is shown suspended within frame 12 by a pair of lever arms 14 and a pair of links 16. The frame includes a base plate 24 rigidly connected to a pair of tubular arms 26 that are bent upward to form vertical supports 27. A pair of brackets 28 are secured to the front of the tubular arms of the frame and rotatably support a tubular cross bar 30. The lever arms 14 have one end rigidly secured to the cross bar so that the lever arms pivot about the axis of the cross bar. A second cross bar 31 is rigidly connected to the arms in the vertical support of the frame.

The seat assembly includes a seat pan 18 rigidly connected to a pair of braces 20 which extend upward from the seat pan forming a back support for back plate 22. The seat pan is designed to provide a single comfortable sitting position for the occupant thereby locating the center of gravity of the occupant at a determinable point. Pivot posts 32 are secured to the underside of the braces on a common axis which is located below the approximate center of gravity of the occupant of the seat. The upper ends of the lever arms 14 are connected to the pivot posts by pins 34 so that the seat pan can pivot about this axis.

It should be obvious that the seat would ordinarily be free to rock on this axis unless some means is provided to resist this tendency. Links 16 are secured to the braces 20 and are provided with pins 38 which are slidably positioned within slots 40 in the upper portion 27 of the tubular arms of the frame. The upper portion of the tubular arms are bent forward so that the slots are angularly offset from the vertical. The angle of slot 40 is slightly backwardly and downwardly inclined and is generally in line with the path of travel of pins 38 when the seat assembly 10 is depressed, yet the seat pan 18 is maintained in the substantially horizontal position. With this arrangement the planar relation of the seat pan to the base plate will always be the same, thereby eliminating any rocking motion as the seat moves up and down.

The motion of the seat pan is resisted by a leaf spring 42 that has its ends positioned to engage bearing plates 45 on the underside of the lever arms. The center portion of the leaf spring is positioned within a channel member 44 that is free to move fore and aft on the base plate. The channel member is moved by turning crank 60 which is secured to adjusting screw 50 that passes through nuts 52 and aperture 54 in mounting block 48. The adjusting screw is supported by brackets 56 and 58 mounted on the base plate. Mounting block 48 is secured to the channel member by bolts 46 and holds the leaf spring in position in the channel member. The force acting on the seat pan is varied according to the weight of the occupant of the seat by moving the channel member fore and aft on the base plate thereby varying the moment arm between the seat pan and the spring.

The back plate is provided with a pair of side brackets 62 that are provided with axial slots 64 and transverse adjusting slots 66, the latter of which has a number of adjustment dwells 67. Pins 68 and 70 are secured to the seat braces and extend into slots 64 and 66, respectively, to hold the back plate in position. The angle of the back plate with respect to the seat pan can be adjusted by lifting the back plate until slot 66 is clear of pins 70 and then tipping the back plate to the desired angle and then lowering the back plate until pin 70 seats in one of the dwells.

The entire seat assembly is mounted on a roller type floor support 74 so that it can be easily moved fore and aft in the vehicle. A simple pull rod arrangement 76 is shown in FIG. 2 for positively locating the seat. On pulling knob 78, bell cranks 80 will be pivoted on pins 82 releasing detents 84 from racks 86. The seat assembly can then be moved and on releasing the pull knob the detents will seat in the racks. A connecting rod 88 can be used to actuate a similar arrangement on the opposite side of the seat. The seat assembly has been described with reference to the seat pan and back plate. The cushions and covers for these members are shown in dotted lines and have been removed to aid in describing the invention.

Although only one embodiment of the present invention has been illustrated and described, it will be apparent to those skilled in the art that various changes and modifications may be made therein without departing from the spirit of the invention or from the scope of the appended claims.

I claim:

1. A seat suspension system comprising, a frame member having a generally horizontally extending base part and an upwardly extending back support part fixed to said base part,
   a seat member having a generally horizontally extending seat pan and an upwardly extending back section fixed to said seat pan,
   a pair of links pivotally connected at one of their ends to said frame and at the other of their ends to the opposite sides of said seat pan on a common transverse axis, said axis being at a location in respect to said seat pan substantially through the point of the center of gravity of an occupant of said seat, and
   biasing means being connected for fore and aft movement in respect to said links to one of said members and being connected to said links intermediate the ends of said links to thereby urge said seat member away from said base part and resiliently resisting motion of said seat member toward said base part,
   guide means interconnecting said back section and said support part to maintain said seat member in generally the same planar relationship in respect to the base part during oscillation of said seat member.

2. A seat suspension system according to claim 1 wherein said biasing means are connected between said links and said frame member.

3. A seat suspension of controlling the relative movement between a seat part and a base part comprising,
   link means pivotally connected at one of its ends to the seat part and pivotally connected at the other of its ends to the base part,
   biasing means operably connected to the base part and to said link means intermediate the two ends of said link means and being operable to resiliently resist relative motion between the seat and base part, and;
   guide means connected to the seat and base parts and operable to control the relative planar position of said seat part in respect to said base part during the relative motion between said parts.

4. A seat suspension according to claim 3 including means for moving said biasing means in respect to said link means to thereby change the position at which said biasing means are connected to said link means and thus vary the effect of the resilient resistance to the relative motion between the parts.

5. A seat suspension according to claim 4 wherein said link means comprise two arms pivotally connected at one of their ends to one of the parts, and wherein said arms are rigidly secured at their other end to a common crossbar which is rotatably secured to the other of the parts, the connection of said biasing means to said link means being to both of said arms and intermediate the ends of said arms.

6. A seat suspension according to claim 5 wherein said biasing means is a leaf spring positioned to engage said arms and movably secured to one of said parts.

7. A seat suspension system, comprising,
   a frame member having a generally horizontally extending base part and an upwardly extending back support part fixed to said base part,
   a seat member having a generally horizontally extending seat pan and an upwardly extending back section rigidly fixed to said seat pan,
   a pair of links pivotally connected at one of their ends to said base part and at substantially the front end of said base part, said links extending upwardly and backwardly and being pivotally connected at their other ends at opposite sides of said seat pan,
   biasing means urging said seat member away from said base part and resiliently resisting motion of said seat member toward said base part, and
   guide means interconnecting said back section and support part and cooperating with said links to maintain said seat member in generally the same planar relationship in respect to said base part during oscillation of said seat member.

8. A seat suspension system, comprising,
   a frame member having a generally horizontally extending base part and an upwardly extending back support part fixed to said base part,
   a seat member having a generally horizontally extending seat pan and an upwardly extending back section fixed to said seat pan,
   a pair of links pivotally connected at one of their ends to said base part and at substantially the front end of said base part, said links extending upwardly and backwardly and pivotally connected at their other ends at opposite sides of said seat pan,
   biasing means urging said seat member away from said base part and resiliently resisting motion of said seat member toward said base part, and
   guide means comprised of downwardly and slightly backwardly inclined slot means in said back support and of roller means connected to said back section and operably engaged with said slot means, said guide means cooperating with said links to maintain said seat member in generally the same planar relationship in respect to said base part during oscillation of said seat member.

9. A seat suspension system, comprising,
   a frame member having a generally horizontally extending base part and an upwardly extending back support part fixed to said base part,
   a seat member having a generally horizontally extending seat pan and an upwardly extending back section fixed to said seat pan,
   a pair of links pivotally connected at one of their ends to said base part and at substantially the front end of said base part, said links extending upwardly and backwardly and being pivotally connected at their other ends at opposite sides of said seat pan,
   biasing means connected to said frame member and to said links intermediate the ends of said links to urge said seat member away from said base part and resiliently resist motion of said seat member towards said base part, and
   guide means interconnecting said back section and support part and cooperating with said links to maintain said seat member in generally the same planar relationship in respect to said base part during oscillation of said seat member.

10. A seat suspension according to claim 8 wherein said links are interconnected at one of their ends by a cross member to which they are rigidly secured.

11. A seat suspension according to claim 10 wherein said cross member is located at the end of said links which is connected to said base part.

12. A seat suspension according to claim 11 wherein said biasing means is movable in the fore and aft direction in respect to said links to thereby change the position at which said biasing means are connected to said links and thus vary the resiliency of said resisting motion.

(References on following page)

References Cited by the Examiner

UNITED STATES PATENTS

| | | | |
|---|---|---|---|
| 1,187,580 | 6/1916 | Webb | 297—309 |
| 1,767,757 | 6/1930 | Harris | 297—307 |
| 1,971,085 | 8/1934 | Tissier | 248—376 |
| 2,248,603 | 7/1941 | Bell | 297—321 |
| 2,286,168 | 6/1942 | Flint | 297—309 |
| 2,366,730 | 1/1945 | Hickman | 297—308 |
| 2,606,592 | 8/1952 | McIntyre | 248—374 |
| 2,636,544 | 4/1953 | Hickman | 248—399 |
| 3,059,967 | 10/1962 | Flint | 297—309 |

FOREIGN PATENTS 551,808    3/1943    Great Britain.

FRANK B. SHERRY, *Primary Examiner.*